United States Patent
Kanayama et al.

(10) Patent No.: US 9,233,685 B2
(45) Date of Patent: Jan. 12, 2016

(54) CONTROL DEVICE OF HYBRID VEHICLE
(71) Applicants: Takeshi Kanayama, Toyota (JP); Masato Watanabe, Toyota (JP); Shinichiro Suenaga, Susono (JP)
(72) Inventors: Takeshi Kanayama, Toyota (JP); Masato Watanabe, Toyota (JP); Shinichiro Suenaga, Susono (JP)
(73) Assignee: TOYOTA JIDOSHA KABUSHIKI KAISHA, Toyota-shi (JP)
( * ) Notice: Subject to any disclaimer, the term of this patent is extended or adjusted under 35 U.S.C. 154(b) by 0 days.
(21) Appl. No.: 14/002,596
(22) PCT Filed: Feb. 6, 2013
(86) PCT No.: PCT/JP2013/052764
§ 371 (c)(1),
(2) Date: Aug. 30, 2013
(87) PCT Pub. No.: WO2014/122744
PCT Pub. Date: Aug. 14, 2014
(65) Prior Publication Data
US 2015/0321660 A1 Nov. 12, 2015
(51) Int. Cl.
B60W 20/00 (2006.01)
B60W 10/06 (2006.01)
(Continued)
(52) U.S. Cl.
CPC .............. B60W 20/40 (2013.01); B60K 6/26 (2013.01); B60W 10/06 (2013.01); B60W 10/08 (2013.01);
(Continued)
(58) Field of Classification Search
CPC ..... B60W 10/04; B60W 10/06; B60W 10/08; B60W 20/20; B60W 20/40; B60W 30/20; B60W 30/18018; B60W 2030/206; B60W 2510/06; B60W 2710/081; B60W 2710/0644; B60W 2510/0638; B60K 6/20–6/24; B60K 6/26; B60K 2006/26; Y02T 10/62; Y02T 10/6213; Y02T 10/6221; Y02T 10/6286; Y10S 903/93; Y10S 903/902; Y10S 903/904–903/906

USPC .................. 701/22, 36, 48, 99, 101, 110, 113; 180/65.21, 65.25–65.26, 65.265, 180/65.275–65.28; 903/904–906, 930
See application file for complete search history.

(56) References Cited

U.S. PATENT DOCUMENTS 4,662,239 A 5/1987 Wörner et al.
5,699,253 A * 12/1997 Puskorius ............. G01M 15/11 701/110

(Continued)

FOREIGN PATENT DOCUMENTS

JP 59-49023 U 3/1984
JP 61-52440 3/1986

(Continued)

OTHER PUBLICATIONS

Written Opinion of the International Search Authority issued Mar. 5, 2013, in PCT/JP2013/052764 filed Feb. 6, 2013 (with English language translation).

Primary Examiner — Bao Long T Nguyen
(74) Attorney, Agent, or Firm — Oblon, McClelland, Maier & Neustadt, L.L.P.

(57) ABSTRACT

It is provided a control device of a hybrid vehicle having a damper device disposed in a power transmission path between an engine and an electric motor, the damper device having different torsion characteristics between torsion in positive direction in which drive power is transmitted from the engine toward the electric motor and torsion in negative direction in which drive power is transmitted from the electric motor toward the engine, the control device being configured to increase rotation of the engine with the electric motor to start the engine, the torsion characteristic in the negative direction of the damper device including a plurality of torsion characteristics having torsional rigidity varying depending on an angle of the torsion, and at start of the engine, the plurality of torsion characteristics being selectively used depending on an engine rotation speed to increase the engine rotation speed.

10 Claims, 4 Drawing Sheets (51) Int. Cl.
*B60W 10/08* (2006.01)
*B60W 30/20* (2006.01)
*B60K 6/26* (2007.10)

(52) U.S. Cl.
CPC .......... *B60W 30/20* (2013.01); *B60K 2006/266* (2013.01); *B60W 2030/206* (2013.01); *B60W 2510/06* (2013.01); *B60W 2710/0644* (2013.01); *B60W 2710/081* (2013.01); *Y10S 903/906* (2013.01); *Y10S 903/93* (2013.01)

(56) References Cited

U.S. PATENT DOCUMENTS

| | | | | |
|---|---|---|---|---|
| 6,208,034 B1* | 3/2001 | Yamaguchi | ............ | B60K 6/365 180/65.235 |
| 6,278,195 B1* | 8/2001 | Yamaguchi | ............ | B60K 6/38 290/40 A |
| 6,354,974 B1* | 3/2002 | Kozarekar | ............ | B60K 6/26 180/65.21 |
| 6,364,807 B1* | 4/2002 | Koneda | ............ | B60K 6/48 180/65.25 |
| 6,574,535 B1* | 6/2003 | Morris | ............ | B60K 6/44 180/65.1 |
| 6,742,487 B2* | 6/2004 | Yamaguchi | ............ | B60K 6/445 123/179.3 |
| 6,911,791 B2* | 6/2005 | Tebbe | ............ | B60W 10/08 123/192.1 |
| 7,406,939 B2* | 8/2008 | Asahara | ............ | B60K 6/442 123/192.1 |
| 7,712,356 B2* | 5/2010 | Suzuki | ............ | B60K 6/445 73/114.04 |
| 7,846,060 B2* | 12/2010 | Kanayama | ............ | B60K 6/445 477/159 |
| 8,001,832 B2* | 8/2011 | Suzuki | ............ | B60K 6/445 73/114.04 |
| 8,033,954 B2* | 10/2011 | Theobald | ............ | B60K 6/26 477/3 |
| 8,088,036 B2* | 1/2012 | Fuchs | ............ | B60W 10/06 475/210 |
| 8,109,857 B2* | 2/2012 | Roses | ............ | B60K 6/48 477/176 |
| 8,352,106 B2* | 1/2013 | Falkenstein | ............ | B60K 6/445 180/65.265 |
| 8,517,892 B2* | 8/2013 | Schulte | ............ | B60K 6/48 477/5 |
| 8,700,243 B2* | 4/2014 | Kamijo | ............ | F02N 11/0844 180/65.265 |
| 8,720,401 B2* | 5/2014 | Vogt | ............ | F02N 11/0814 123/179.25 |
| 2004/0040815 A1 | 3/2004 | Fukushima | | |
| 2006/0225984 A1* | 10/2006 | Tanishima | ............ | B60K 6/387 192/48.8 |
| 2007/0203632 A1* | 8/2007 | Saitou | ............ | B60W 30/20 701/51 |
| 2008/0000746 A1* | 1/2008 | Schiele | ............ | B60K 6/387 192/3.54 |
| 2010/0089064 A1* | 4/2010 | Falkenstein | ............ | B60K 6/48 60/702 |
| 2012/0077605 A1 | 3/2012 | Nakagaito et al. | | |
| 2012/0083386 A1* | 4/2012 | Vogt | ............ | B60K 6/48 477/5 |

FOREIGN PATENT DOCUMENTS

| | | |
|---|---|---|
| JP | 2002 13547 | 1/2002 |
| JP | 2002-13547 A | 1/2002 |
| JP | 2004-092822 | 3/2004 |
| JP | 2004-270854 | 9/2004 |
| JP | 2012 62912 | 3/2012 |
| JP | 2012-62912 A | 3/2012 |
| JP | 2012 67877 | 4/2012 |
| JP | 2012-67877 A | 4/2012 |
| JP | 2013-015188 | 1/2013 |

* cited by examiner

CONTROL DEVICE OF HYBRID VEHICLE

TECHNICAL FIELD

The present invention relates to a control device of a hybrid vehicle and particularly to control at the start of an engine.

BACKGROUND ART

A hybrid vehicle is well known that has a structure with a damper device interposed in a power transmission path between an engine and an electric motor. A damper for hybrid driving device described in Patent Document 1 is an example thereof. Such a damper device generally has a damper characteristic set such that a resonance rotation range is equal to or less than an engine rotation range during driving of a vehicle so as to suppress torsional resonance in the engine rotation range during driving of the vehicle as described in Patent Document 2, for example. Patent Document 3 describes that a torsional characteristic of a damper device is changed in stages to reduce variation of torsional rigidity from a low torque range to a high torque range.

PRIOR ART DOCUMENTS

Patent Documents

Patent Document 1: Japanese Laid-Open Patent Publication No. 2002-13547
Patent Document 2: Japanese Laid-Open Patent Publication No. 2012-62912
Patent Document 3: Japanese Laid-Open Patent Publication No. 2012-67877

SUMMARY OF THE INVENTION

Problem to be Solved by the Invention

A hybrid vehicle applies a cranking torque raising an engine rotation speed from an electric motor at the start of an engine. In this case, when the engine rotation speed increases, if the engine rotation speed coincides with a rotation speed corresponding to a resonant frequency, torsional resonance occurs, causing vibration and noise and deteriorating drivability. Especially, a hybrid vehicle frequently repeats the start and stop of the engine during running of the vehicle, which makes this problem prominent. Although the Patent Document 3 describes that a torsional characteristic is changed in stages to prevent the deterioration of drivability, no specific details are disclosed that enable the suppression of the torsional resonance at the start of the engine.

The present invention was conceived in view of the situations and it is therefore an object of the present invention to provide a device capable of suppressing torsional resonance at the start of an engine in a hybrid vehicle including a damper device interposed in a power transmission path between the engine and an electric motor.

Means for Solving the Problem

To achieve the object, the first aspect of the invention provides (a) a control device of a hybrid vehicle having a damper device disposed in a power transmission path between an engine and an electric motor, (b) the damper device having different torsion characteristics between torsion in positive direction in which drive power is transmitted from the engine toward the electric motor and torsion in negative direction in which drive power is transmitted from the electric motor toward the engine, (c) the control device increasing rotation of the engine with the electric motor to start the engine, wherein (d) the torsion in the negative direction of the damper device includes a plurality of torsion characteristics having torsional rigidity varying depending on an angle of the torsion, and wherein (e) at start of the engine, the plurality of torsion characteristics is selectively used depending on an engine rotation speed to increase the engine rotation speed.

Effects of the Invention

Consequently, the torsion characteristics of the damper device in the negative direction include a plurality of torsion characteristics having torsional rigidity varying depending on a torsion angle and, at the start of the engine, the plurality of the torsion characteristics can selectively be used depending on the engine rotation speed to increase the engine rotation speed, thereby preventing the engine rotation speed from coinciding with the rotation speed corresponding to the resonant frequency during the increase in the engine rotation speed. Therefore, the torsional resonance during the increase in the engine rotation speed can be avoided to improve the drivability.

Preferably, (a) the damper device has a first torsion characteristic corresponding to a first resonant frequency and a second torsion characteristic corresponding to a second resonant frequency higher than the first resonant frequency in torsion in the negative direction, (b) when the start of the engine is initiated, the engine rotation speed is increased at a torsion angle corresponding to the second torsion characteristic, and (c) when the engine rotation speed reaches a rotation speed higher than a rotation speed corresponding to the first resonant frequency and lower than a rotation speed corresponding to the second resonant frequency, an electric motor torque of the electric motor is reduced to increase the engine rotation speed at a torsion angle corresponding to the first torsion characteristic. Consequently, when the start of the engine is initiated, since the damper device has the torsion angle corresponding to the second torsion characteristic, the rotation speed corresponding to the resonant frequency is made higher and the engine rotation speed does not reach the rotation speed. When the engine rotation speed exceeds the rotation speed corresponding to the first resonant frequency to be a rotation speed lower than the rotation speed corresponding to the second resonant frequency, since the electric motor torque is reduced and the engine rotation speed increases at the torsion angle corresponding to the first torsion characteristic, the engine rotation speed becomes higher than the rotation speed corresponding to the first resonant frequency and goes away from the rotation speed corresponding to the first resonant frequency as the engine rotation speed increases. Since the engine rotation speed is prevented from coinciding with the rotation speed corresponding to the resonant frequency during the start of the engine in this way, the torsional resonance during the start of the engine can be avoided to improve the drivability.

Preferably, the damper device has at least two torsion characteristics in torsion in the negative direction, and a characteristic at a larger torsion angle has a higher resonant frequency as compared to a characteristic at a smaller torsion angle for an engine rotation speed. As a result, although a larger torque is output when the start of the engine is initiated, the resonant frequency is made higher at this point and, therefore, the engine rotation speed corresponding to the resonant frequency is set to a higher value. Although the larger torque becomes unnecessary and the torque is reduced as the engine rotation speed increases, this reduction of torque causes the resonant frequency to switch to the lower value. Since the engine rotation speed is higher than the rotation speed corresponding to the resonant frequency at this point, the engine rotation speed is prevented from coinciding with the rotation speed corresponding to the resonant frequency.

Preferably, when the start of the engine is initiated, the electric motor torque is controlled such that a torque transmitted to the damper device does not fall below a preset lower limit torque setting the torsion characteristic of the damper device to the second torsion characteristic. As a result, when the start of the engine is initiated, the torsion characteristic of the damper device is initially maintained to the second torsion characteristic and the rotation speed corresponding to the resonant frequency is set to a higher value relative to the engine rotation speed. Therefore, when the start of the engine is initiated, the engine rotation speed can initially be kept away from the rotation speed corresponding to the resonant frequency.

Preferably, when the engine rotation speed reaches a rotation speed lower by a predetermined value than the rotation speed corresponding to the second resonant frequency, the electric motor torque is controlled such that a torque transmitted to the damper device becomes lower than a preset upper limit torque setting the torsion characteristic of the damper device to the first torsion characteristic. As a result, when the engine rotation speed reaches the rotation speed lower by the predetermined value than the rotation speed corresponding to the second resonant frequency, the torsion characteristic of the damper device is switched to the first torsion characteristic and, therefore, the engine rotation speed becomes higher than the rotation speed corresponding to the first resonant frequency. Thus, even if further increasing, the engine rotation speed is prevented from coinciding with the rotation speed corresponding to the resonant frequency.

Preferably, both the engine rotation speed corresponding to the first resonant frequency and the engine rotation speed corresponding to the second resonant frequency are set to a value lower than the idle rotation speed of the engine. As a result, since the engine rotation speed is not set to the rotation speed corresponding to the resonant frequency during driving of the engine, the occurrence of torsional resonance is avoided during driving of the engine.

Preferably, the resonant frequency to the engine rotation speed is a value acquired by converting the engine rotation speed causing torsional resonance into a frequency. In other words, the torsional resonance occurs if the engine rotation speed coincides with a rotation speed corresponding to the resonant frequency.

MODE FOR CARRYING OUT THE INVENTION

An embodiment of the present invention will now be described in detail with reference to the drawings. In the following embodiment, the figures are simplified or deformed as needed and portions are not necessarily precisely depicted in terms of dimension ratio, shape, etc.

EMBODIMENT

Figure 1:
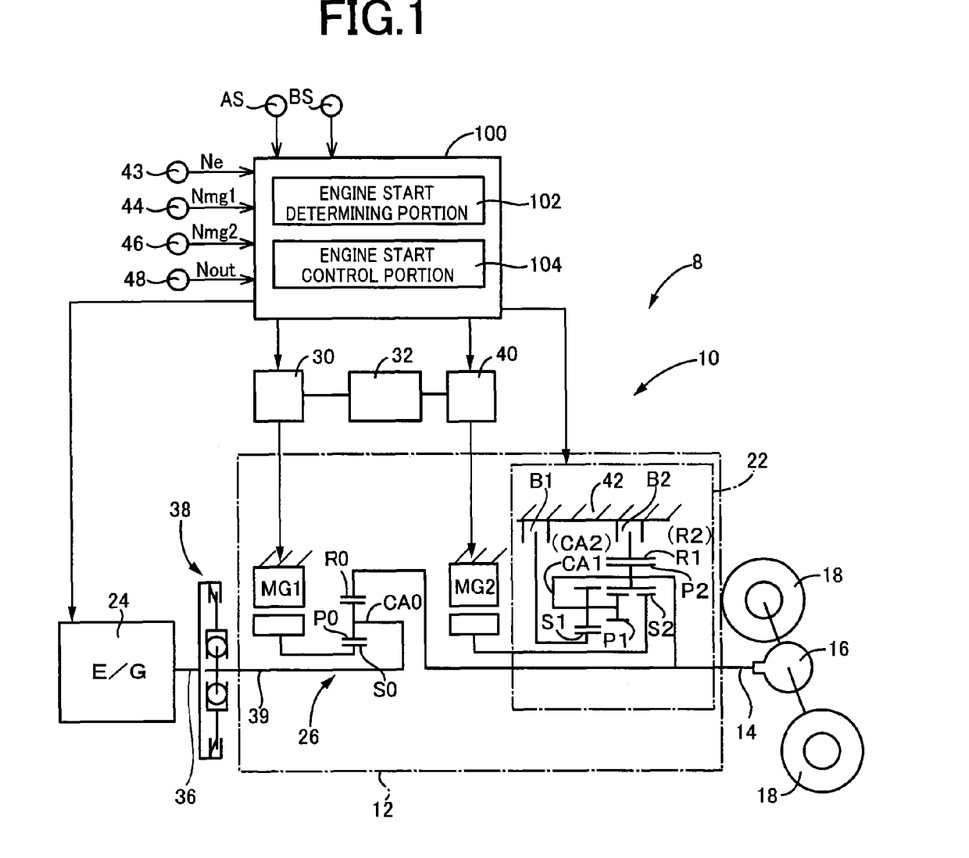
FIG. 1 is a schematic of a configuration for explaining a vehicle drive device of a hybrid vehicle to which the present invention is applied.

FIG. 1 is a schematic of a configuration for explaining a vehicle drive device 10 of a hybrid vehicle 8 (vehicle 8) to which the present invention is applied. The vehicle drive device 10 includes an engine 24, a power transmission device 12, and a damper device 38 described later disposed between the engine 24 and the power transmission device 12. In FIG. 1, the vehicle drive device 10 transmits a torque of the engine 24 acting as a main drive source via the damper device 38 described later and a planetary gear device 26 to a wheel-side output shaft 14 in the vehicle 8 and the torque is transmitted from the wheel-side output shaft 14 via a differential gear device 16 to a pair of left and right drive wheels 18. The vehicle drive device 10 is disposed with a second electric motor MG2 capable of selectively providing power running control for outputting drive power for running and regenerative control for recovering energy and the second electric motor MG2 is coupled via an automatic transmission 22 to the wheel-side output shaft. Therefore, the output torque transmitted from the second electric motor MG2 to the wheel-side output shaft is increased and decreased depending on a gear ratio γs (=rotation speed Nmg2 of the second electric motor MG2/rotation speed Nout of the wheel-side output shaft) set by the automatic transmission 22.

The automatic transmission 22 interposed in a power transmission path between the second electric motor MG2 and the drive wheels 18 is configured such that a plurality of stages having the gear ratio γs greater than "1" can be established and, at the time of power running when a torque is output from the second electric motor MG2, the torque can be increased and transmitted to the wheel-side output shaft and, therefore, the second electric motor MG2 is configured with a lower capacity or in a smaller size. As a result, for example, if the rotation speed Nout of the wheel-side output shaft is increased in association with higher vehicle speed, the gear ratio γs is made smaller to reduce the rotation speed (hereinafter referred to as a second electric motor rotation speed) Nmg2 of the second electric motor MG2 so as to maintain the operation efficiency of the second electric motor MG2 in a favorable state, or if the rotation speed Nout of the wheel-side output shaft is reduced, the gear ratio γs is made larger to increase the second electric motor rotation speed Nmg2.

The power transmission device 12 includes a first electric motor MG1 and the second electric motor MG2 and transmits the torque of the engine 24 to the drive wheels 18. The engine 24 is a known internal combustion engine combusting fuel to output power, such as a gasoline engine and a diesel engine, and is configured to have an operational state, such as a throttle valve opening degree, an intake air amount, a fuel supply amount, and ignition timing, electrically controlled by an engine-control electronic control device 100 (E-ECU) not depicted mainly made up of a microcomputer. The electronic control device 100 is supplied with detection signals from an accelerator operation amount sensor AS detecting an accelerator opening degree Acc that is an operation amount of an accelerator pedal, a brake sensor BS for detecting the presence of operation of a brake pedal, a crank angle sensor 43 detecting an engine rotation speed Ne corresponding to a crank angle of a crankshaft 36, a first resolver 44 detecting a first electric motor rotation speed Nmg1 of the first electric motor MG1, a second resolver 46 detecting the second electric motor rotation speed Nmg2 of the second electric motor MG2, an output shaft rotation speed sensor 48 detecting the rotation speed Nout of the wheel-side output shaft 14 corresponding to a vehicle speed V, etc.

The first electric motor MG1 (an electric motor of the present invention) is, for example, a synchronous electric motor, is configured to selectively fulfill a function as an electric motor generating a drive torque Tm1 and a function as an electric generator, and is connected via an inverter 30 to an electric storage device 32 such as a battery and a capacitor. The inverter 30 is controlled by a motor-generator-control electronic control device 100 (MG-ECU) not depicted mainly made up of a microcomputer to control the electric motor torque Tm1 of the first electric motor MG1.

The planetary gear device 26 is a single pinion type planetary gear mechanism including a sun gear S0, a ring gear R0 disposed concentrically to the sun gear S0, and a carrier CA0 supporting a pinion gear P0 meshing with the sun gear S0 and the ring gear R0 in a rotatable and revolvable manner as three rotating elements to generate a known differential action. The planetary gear device 26 is disposed concentrically to the engine 24 and the automatic transmission 22. Since the planetary gear device 26 and the automatic transmission 22 are symmetrically configured relative to a center line, the lower halves thereof are not depicted in FIG. 1.

In this embodiment, the crankshaft 36 of the engine 24 is coupled via the damper device 38 and a power transmission shaft 39 to the carrier CA0 of the planetary gear device 26. On the other hand, the sun gear S0 is coupled to the first electric motor MG1, and the ring gear R0 is coupled to the wheel-side output shaft. The carrier CA0, the sun gear S0, and the ring gear R0 act as an input element, a reaction force element, and an output element, respectively.

If a reaction force torque Tm1 from the first electric motor MG1 is input to the sun gear S0 for an output torque of the engine 24 input to the carrier CA0 in the planetary gear device 26, a direct torque occurs in the ring gear R0 that is the output element and, therefore, the first electric motor MG1 acts as an electric generator. When the rotation speed of the ring gear R0, i.e., the rotation speed (output shaft rotation speed) Nout of the wheel-side output shaft 14 is constant, the rotation speed (engine rotation speed) Ne of the engine 24 can be varied continuously (in a stepless manner) by changing the rotation speed Nmg1 of the first electric motor MG1 higher and lower.

The automatic transmission 22 of this embodiment is made up of a set of Ravigneaux type planetary gear mechanisms. In other words, the automatic transmission 22 is disposed with a first sun gear S1 and a second sun gear S2; a larger diameter portion of a stepped pinion P1 meshes with the first sun gear S1; a smaller diameter portion of the stepped pinion P1 meshes with a pinion P2; and the pinion P2 meshes with a ring gear R1 (R2) disposed concentrically to the sun gears S1 and S2. The pinions P1 and P2 are held by a common carrier CA1 (CA2) in a rotatable and revolvable manner. The second sun gear S2 meshes with the pinion P2.

The second electric motor MG2 is controlled via an inverter 40 by the motor-generator-control electronic control device 100 (MG-ECU) to act as an electric motor or an electric generator and an assist output torque or a regenerative torque is adjusted or set. The second sun gear S2 is coupled to the second electric motor MG2 and the carrier CA1 is coupled to the wheel-side output shaft. The first sun gear S1 and the ring gear R1 make up a mechanism corresponding to a double pinion type planetary gear device along with the pinions P1 and P2 and the second sun gear S2 and the ring gear R1 make up a mechanism corresponding to a single pinion type planetary gear device along with the pinion P2.

The automatic transmission 22 is disposed with a first brake B1 disposed between the first sun gear S1 and a housing 42 that is a non-rotating member for selectively fixing the first sun gear S1, and a second brake B2 disposed between the ring gear R1 and the housing 42 for selectively fixing the ring gear R1. The brakes B1, B2 are so-called friction engagement devices using a frictional force to generate a braking force and are implemented by employing multi-plate type engagement devices or band-type engagement devices. The brakes B1, B2 are configured such that torque capacities thereof are respectively continuously changed depending on engagement pressures generated by a hydraulic actuator for the brake B1 and a hydraulic actuator for the brake B2 such as hydraulic cylinders.

The automatic transmission 22 configured as described above is configured such that the second sun gear S2 acts as an input element, that the carrier CA1 acts as an output element, that a high-speed stage H is established with a gear ratio γsh greater than "1" when the first brake B1 is engaged, and that a low-speed stage L is established with a gear ratio γsl greater than the gear ratio γsh of the high-speed stage H when the second brake B2 is engaged instead of the first brake B1. In other words, the automatic transmission 22 is a two-speed transmission in which a shift between the gear stages H and L is performed based on a running state such as the vehicle speed V and a required drive power (or an accelerator operation amount). More specifically, shift stage ranges are determined in advance as a map (shift diagram) and control is provided such that one of the shift stages is set depending on a detected operational state.

Figure 2A:
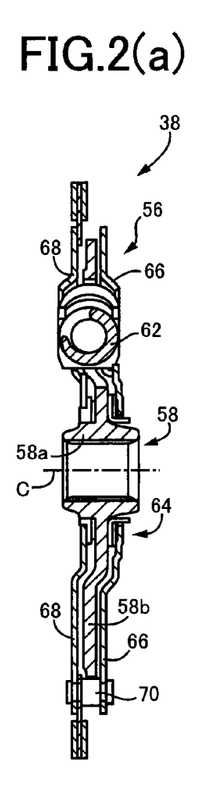
FIG. 2 is a diagram of details of structure of the damper device of FIG. 1.

FIG. 2 is a diagram of details of structure of the damper device 38 of FIG. 1 and FIG. 2($a$) is a cross-sectional view of the damper device 38 while FIG. 2($b$) is a front view of the damper device 38. FIG. 2($a$) corresponds to a cross-sectional view taken along the line X-X of FIG. 2($b$) and FIG. 2($b$) is a partially cross-sectional view.

The damper device 38 is disposed around an axial center C between the engine 24 and the planetary gear device 26 in a power transmittable manner. Since the first electric motor MG1 is coupled to the planetary gear device 26 in a power transmittable manner, the damper device 38 is disposed on the power transmission path between the engine 24 and the first electric motor MG1. The power transmission shaft 39 depicted in FIG. 1 is spline-fitted to an inner circumferential portion (a hub 58) of the damper device 38.

The damper device 38 includes a pair of disc plates 56 rotatable around the rotation axial center C, the hub 58 relatively rotatable around the same rotation axial center C to the disc plates 56, coil springs 62$a$ and 62$b$ made of spring steel interposed between the disc plates 56 and the hub 58 to couple the disc plates 56 and the hub 58 in a power transmittable manner, and a hysteresis mechanism 64 generating a hysteresis torque between the disc plates 56 and the hub 58.

The disc plates 56 are made up of a pair of a first disc plate 66 (hereinafter, a first plate 66) and a second disc plate 68 (hereinafter, a second plate 68) on the right and left sides and have outer circumferential portions relatively non-rotatably fastened to each other by a rivet 70 with the coil springs 62$a$ and 62$b$ and the hub 58 axially sandwiched by the plates 66 and 68. The first plate 66 has four opening holes formed circumferentially at regular angular intervals for housing the coil springs 62a and 62b. The second plate 68 has four opening holes formed circumferentially at the same positions as the opening holes of the first plate 66 at regular angular intervals for housing the coil springs 62a and 62b. The coil springs 62a and 62b are housed in spaces formed by the opening holes of the first plate 66 and the opening holes of the second plate 68.

In this embodiment, the four spaces are formed by the opening holes of the first plate 66 and the opening holes of the second plate 68, and the two coil springs 62a and the two coil springs 62b are alternately housed in the spaces. The coil spring 62b is made up of a large diameter coil spring and a small diameter coil spring housed inside the large diameter coil spring. In this embodiment, the large diameter coil spring and the small diameter coil spring are collectively defined as the coil spring 62b.

The hub 58 is made up of a cylindrical base portion 58a including inner circumferential teeth spline-fitted to the power transmission shaft 39 on an inner circumferential portion and a disc-shaped flange portion 58b radially extending from an outer circumferential surface of the base portion 58a. The flange portion 58b has four spring housing holes 58c formed circumferentially at regular angular intervals. The coil springs 62a and 62b are housed in the spring housing holes 58c.

The coil spring 62a is housed in the spring housing hole 58c such that a pair of spring seats 72a holding the coil spring 62a from the both ends abuts on the flange portion 58b while no torque is transmitted to the damper device 38. On the other hand, the coil spring 62b is housed such that predetermined gaps are formed between a pair of spring seats 72b holding the coil spring 62b and the flange portion 58b. Therefore, the hub 58 (the flange portion 58b) does not abut on the spring seats 72b holding the coil spring 62b until a torsion angle θ of the damper device 38 reaches a predetermined torsion angle θ.

Figure 2B:
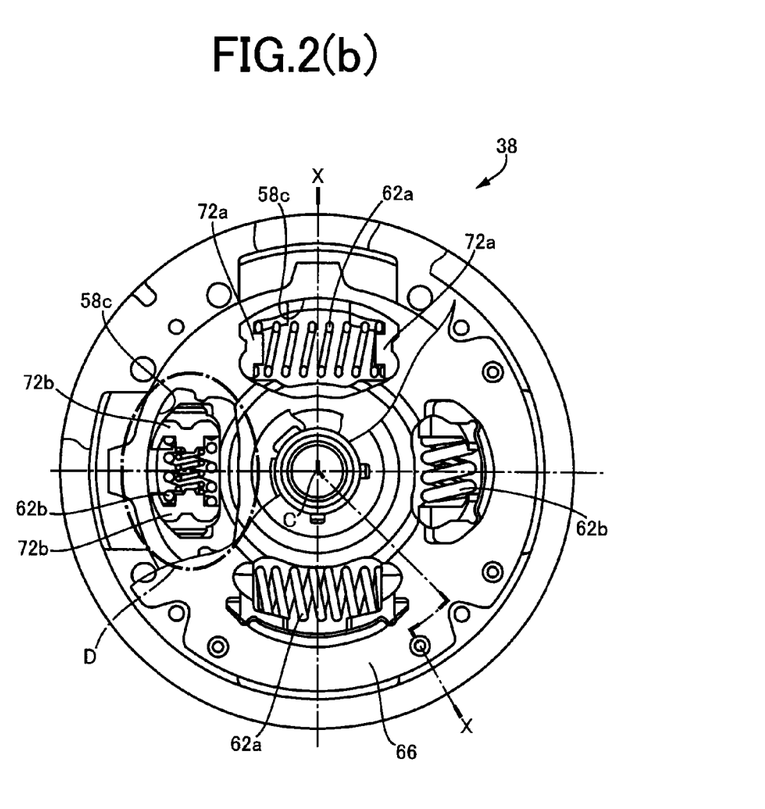
Figure 3:
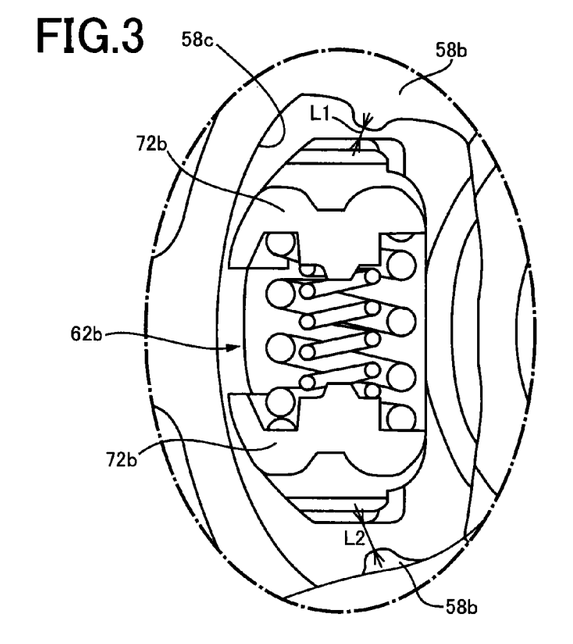
FIG. 3 is an enlarged view of a portion around the coil spring in the damper device of FIG. 2.

FIG. 3 is an enlarged cross-sectional view of a portion surrounded by a bold dashed-dotted line D of FIG. 2(b), i.e., a portion around the coil spring 62b. As depicted in FIG. 3, gaps L are formed between a pair of the spring seats 72b sandwiching and holding the coil spring 62b from the both ends and the hub 58 (the flange portion 58b) and are asymmetrically formed. Specifically, in FIG. 3, a gap L1 formed on the upper side (clockwise side) between the spring seat 72b and the flange portion 58b is formed smaller than a gap L2 formed on the lower side (anticlockwise side). As a result, in FIG. 3, a torsion angle θ1 (corresponding to the gap L1) formed by rotating the hub 58 anticlockwise relative to the coil spring 62b and causing the flange portion 58b (hub 58) to abut on the spring seat 72b is smaller than a torsion angle θ2 (corresponding to the gap L2) formed by rotating the flange portion 58b (the hub 58) clockwise relative to the coil spring 62b and causing the flange portion 58b to abut on the spring seat 72b.

In the damper device 38 configured as described above, when the disc plates 56 rotate anticlockwise around the axial center C, one ends of the coil springs 62a and 62b are pressed and the coil springs 62a and 62b are caused to revolve anticlockwise around the axial center C in the same way. The other ends of the coil springs 62a press the flange portion 58b (the hub 58), thereby rotating the hub 58 anticlockwise. When the torsion angle θ reaches a predetermined value θ2, the other ends of the coil springs 62b also abut on the flange portion 58b (the hub 58) via the spring seats 72b and the coil springs 62b also press the hub 58 toward the anticlockwise side. Therefore, the hub 58 is rotated anticlockwise by the coil springs 62a and 62b. In this case, since the coil springs 62a and 62b transmit power while elastically deforming, shock due to torque variation is absorbed by the coil springs 62a and 62b. In this embodiment, the disc plates 56 are coupled to the engine 24 in a power transmittable manner and, when drive power is transmitted from the engine 24 toward the first electric motor MG1, torque is transmitted to rotate the disc plates 56 anticlockwise, When the drive power is transmitted from the engine 24 toward the first electric motor MG1, the damper device 38 is twisted in positive direction. In other words, the damper device 38 is twisted at a positive torsion angle θ.

When the hub 58 rotates anticlockwise around the axial center C, one ends of the coil springs 62a are pressed and the coil springs 62a are caused to revolve anticlockwise around the axial center C. The other ends of the coil springs 62a press the disc plates 56, thereby rotating the disc plates 56 anticlockwise around the axial center C. When the torsion angle θ reaches a predetermined value θ1, the flange portion 58b (the hub 58) abuts on one ends of the coil springs 62b via the spring seats 72b and the other ends of the coil springs 62b further press the disc plates 56 anticlockwise. Therefore, the disc plates 56 are rotated anticlockwise by the coil springs 62a and 62b. When drive power is transmitted from the first electric motor MG1 toward the engine 24 in the direction of driving the engine 24, torque is transmitted from the hub 58 side to rotate the hub 58 anticlockwise. When the drive power is transmitted from the first electric motor MG1 toward the engine 24 in the direction of driving the engine 24, the damper device 38 is twisted in negative direction. In other words, the damper device 38 is twisted at a negative torsion angle θ.

Figure 4:
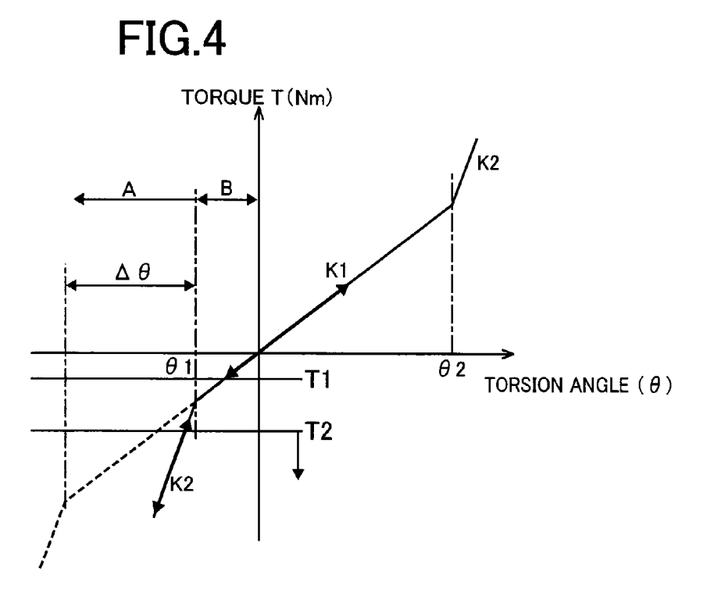
FIG. 4 is a diagram of torsion characteristics of the damper device of FIG. 2.

FIG. 4 depicts damper torsion characteristics of the damper device 38. In FIG. 4, a horizontal axis indicates the torsion angle θ that is a relative rotation angle between the hub 58 and the disc plates 56 and a vertical axis indicates torque T(Nm) applied to the damper device 38. The positive torsion angle θ corresponds to a torsion angle when the engine 24 is driven, i.e., a torsion angle when torque is transmitted from the disc plate 56 side to rotate the damper device 38 anticlockwise. On the other hand, the negative torsion angle θ corresponds to a torsion angle when torque is transmitted from the hub 58 side (the power transmission shaft 39 side) to rotate the damper device 38 anticlockwise. Although the damper device 38 includes the hysteresis mechanism 64, the hysteresis torque is omitted in FIG. 4.

As depicted in FIG. 4, as the drive power (drive torque) transmitted from the engine 24 side increases, the positive torsion angle θ increases. When the positive torsion angle θ reaches the predetermined value θ2, since the coil springs 62b abut on the hub 58, the rigidity of the damper device 38 becomes higher and a slope of torque relative to the torsion angle θ is made larger. In particular, at the torsion angle θ1, the torsional rigidity of the coil springs 62a and 62b is switched from rigidity K1 to torsional rigidity K2 greater than the rigidity K1.

As the drive power (drive torque) transmitted from the hub 58 side increases, the negative torsion angle increases. When the negative torsion angle θ reaches the predetermined value θ1, since the hub 58 abuts on the coil springs 62b, the rigidity of the damper device 38 becomes higher and a slope of torque relative to the torsion angle θ is made larger. In particular, at the torsion angle θ2, the torsional rigidity of the coil springs 62a and 62b is switched from the rigidity K1 to the torsional rigidity K2 greater than the rigidity K1. Therefore, since the torsional rigidity is changed in negative torsion of the damper device 38 depending on the torsion angle θ, the damper device 38 has two torsional characteristics having different resonance frequencies to the engine rotation speed Ne depending on the torsion angle θ. Specifically, the damper device 38 has a first torsion characteristic B corresponding to a resonant frequency f1 at the torsion angle θ less than the predetermined value θ1 and a second torsion characteristic A corresponding to a resonant frequency f2 higher than the resonant frequency f1 at the torsion angle θ equal to or greater than the predetermined value θ1 in the negative torsion. The characteristic at the larger torsion angle θ corresponds to a higher resonant frequency f as compared to the characteristic at the smaller torsion angle θ because when the torsion angle θ increases to the predetermined value θ1, the hub 58 abuts on the coil springs 62b and makes the torsional rigidity of the damper device 38 higher. The resonant frequency f to the engine rotation speed Ne is a value acquired by converting the engine rotation speed Ne causing torsional resonance into a resonant frequency f of a drive system and the torsional resonance occurs if the engine rotation speed Ne reaches a rotation speed corresponding to the resonant frequency f. The resonant frequency f1 corresponds to a first resonant frequency of the present invention while the resonant frequency f2 corresponds to a second resonant frequency of the present invention, and both the resonance frequencies f1 and f2 are set to a value lower than an idle rotation speed Nidle of the engine 24 in the present embodiment.

As depicted in FIG. 4, the torsion angle θ2 is larger than the torsion angle θ1. This is because the gap L2 depicted in FIG. 3 is larger than the gap L1. As described above, the damper device 38 has different torsion characteristics between a positive torsion angle (torsion in positive direction) and a negative torsion angle (torsion in negative direction). Specifically, the torsion angle θ1 of switching from the torsional rigidity K1 to the torsional rigidity K2 at a negative torsion angle is made smaller by a torsion angle Δθ than the torsion angle θ2 of switching at a positive torsion angle.

Returning to FIG. 1, the electronic control device 100 includes a so-called microcomputer equipped with a CPU, a RAM, a ROM, and an input/output interface, for example, and the CPU executes signal processes in accordance with programs stored in advance in the ROM, while utilizing a temporary storage function of the RAM, to provide the various controls of the hybrid vehicle 8. For example, the electronic control device 100 provides output control of the engine 24, drive control and the regenerative control of the first electric motor MG1 and the second electric motor MG2, shift control of the automatic transmission 22, etc., and is configured separately for the engine control, the electric motor control, hydraulic control (shift control), etc., as needed.

The electronic control device 100 functionally includes an engine start determining portion 102 (engine start determining means) determining the switch from motor running to engine running, i.e., determining the start of the engine 24, based on a running state of the vehicle 8 and an engine start control portion 104 (engine start control means) providing start control of the engine 24.

The engine start determining portion 102 makes a determination of the switch from the motor running to the engine running, or in other words, determines the start of the engine 24, based on whether a running state of the vehicle satisfies a predetermined condition during the motor running. The engine start determining portion 102 determines that the engine 24 is started for the switch to the engine running, when the running state of the vehicle is switched from a motor running range to an engine running range based on a running mode map indicative of running ranges for the motor running and the engine running consisting of the vehicle speed V and the accelerator opening degree Acc set in advance, for example.

The engine start control portion 104 is executed when the start of the engine 24 is determined based on the engine start determining portion 102. The engine start control portion 104 causes the first electric motor MG1 to output the torque Tm1 cranking the engine 24 (torque increasing the engine rotation speed) to raise and increase the engine rotation speed Ne to a rotation speed enabling self-sustained operation before allowing the combustion of the engine 24 and starting the engine 24. Since the first electric motor MG1 is coupled to the damper device 38 via the planetary gear device 26, the electric motor torque Tm1 of the first electric motor MG1 is converted into a cranking torque T calculated based on a gear ratio of the planetary gear device 26 and transmitted to the damper device 38.

The vehicle 8 is set such that the torsional resonance occurs at a rotation speed lower than the idle rotation speed of the engine 24 so as to prevent the torsional resonance from occurring in a normal rotation speed range of the engine 24. Therefore, in a transition period while the engine rotation speed Ne is increased at the start of the engine, the rotation speed passes through the engine rotation speed corresponding to the resonant frequency of the vehicle 8. During this period, the torsional resonance occurs and facilitates the generation of shock and noise due to vibration. For example, at extremely-low temperature, the friction of the engine 24 is increased and, therefore, the rotation speed tends to stay at the rotation speed corresponding to the resonant frequency at the start of the engine. The hybrid vehicle 8 frequently repeats the start and stop of the engine 24, which makes this problem prominent.

To solve this problem, at the start of the engine, the engine start control portion 104 selectively uses a plurality of (in this embodiment, two) torsional characteristics included in the damper device 38 depending on the engine rotation speed Ne, thereby suppressing the occurrence of the torsional resonance. The specific control of the engine start control portion 104 will hereinafter be described.

At the start of the engine, the cranking torque T increasing the engine rotation speed is transmitted from the first electric motor MG1 via the planetary gear device 26 and the damper device 38 to the engine 24. In this case, the cranking torque T is transmitted to the damper device 38 from the hub 58 side, forming a negative torsion angle θ in the damper device 38. Therefore, at the start of the engine, the torsional characteristic in the negative torsion angle range is utilized.

When the start of the engine is initiated, the engine start control portion 104 initially sets the torque Tm1 of the first electric motor MG1 higher to make the cranking torque T transmitted to the damper device 38 higher. Specifically, the control is provided so as to transmit to the damper device 38 a torque larger than a torque T2 forming the torsion angle θ of the damper device 38 larger than the predetermined value θ1. Therefore, the torsional characteristic of the damper device 38 is set to the second torsion characteristic A. In this state, the resonant frequency f of the drive system is set to the resonant frequency f2 based on the torsional rigidity K2. As the engine rotation speed Ne increases, when the engine rotation speed Ne is in a rotation speed range higher than a rotation speed Nf1 corresponding to the resonant frequency f1 and lower by a predetermined value α than the resonant frequency f2, the engine start control portion 104 maintains the state in which the cranking torque T is larger than the torque T2. When the engine rotation speed Ne comes close to a rotation speed Nf2 corresponding to the resonant frequency f2, before reaching the rotation speed Nf2 corresponding to the resonant frequency f2, the engine start control portion 104 controls the torque Tm1 of the first electric motor MG1 to reduce the cranking torque T transmitted to the damper device 38. Specifically, the cranking torque T is reduced until the cranking torque T becomes equal to or less than a torque T1 forming the torsion angle θ smaller than the predetermined value θ1. In this state, the torsional characteristic of the damper device 38 is set to the first torsion characteristic B and the resonant frequency f is set to the resonant frequency f1 smaller than the resonant frequency f2. The engine rotation speed Nf1 corresponding to the resonant frequency f1 is a rotation speed lower than the rotation speed Nf1. Therefore, after the engine rotation speed Ne passes through the rotation speed Nf1 corresponding to the resonant frequency f1, if the cranking torque T is reduced to switch the resonant frequency f from the resonant frequency f2 to the resonant frequency f1, the engine rotation speed Ne becomes higher than the rotation speed Nf1 corresponding to the resonant frequency f1 and, as the engine rotation speed Ne further increases, the engine rotation speed Ne goes away from the rotation speed corresponding to the resonant frequency f. Therefore, the engine rotation speed Ne is prevented from coinciding with the rotation speed corresponding to the resonant frequency f.

The engine start control will be described with reference to a time chart at the start of the engine depicted in FIG. 5. When it is determined that the engine 24 is started, the cranking torque is output from the first electric motor MG1 and the engine rotation speed Ne starts increasing. Increasing the engine rotation speed Ne from zero requires a larger cranking torque and, when the start of the engine is initiated, the engine start control portion 104 outputs the torque Tm1 of the first electric motor MG1 such that the cranking torque T transmitted to the damper device 38 becomes larger than the torque T2. The torsion characteristic of the damper device 38 is accordingly set to the second torsion characteristic A (resonant frequency f2).

When the increase in the engine rotation speed Ne is started by the first electric motor MG1, it is determined whether the engine rotation speed Ne comes close to the engine rotation speed Nf1 corresponding to the resonant frequency f1 based on the torsional rigidity K1. Specifically, it is determined whether the engine rotation speed Ne exceeds a value (=Nf1−β) lower by a predetermined value β set in advance than the engine rotation speed Nf1. The predetermined value β is a value adaptively obtained from experiment in advance and is a margin obtained in consideration of time until the engine rotation speed Ne reaches the rotation speed Nf1 etc.

When the engine rotation speed Ne reaches the rotation speed (Nef1−β) at time t1 of FIG. 5, it is determined that the engine rotation speed Ne comes close to the rotation speed Nf1 corresponding to the resonant frequency f1, and the engine start control portion 104 controls the torque Tm1 of the first electric motor MG1 such that the cranking torque T does not fall below the torque T2 set in advance. In other words, a lower limit guard value (the torque T2) of the cranking torque T is set and the cranking torque T is maintained at the torque T2. The torque T2 is a value adaptively obtained in advance and is set to a value at which the torsion characteristic of the damper device 38 is set to the second torsion characteristic A, i.e., the resonant frequency f2, as depicted in FIG. 4. Therefore, when the engine rotation speed Ne exceeds the rotation speed (Nef1−β) at time t1, the control is provided such that the cranking torque T does not become equal to or less than the torque T2, and the resonant frequency f is set to the resonant frequency f2 determined based on the torsional rigidity K2. The resonant frequency f2 is a value higher than the resonant frequency f1 determined based on the torsional rigidity K1, and the rotation speed Nf2 corresponding to the resonant frequency f2 is a value higher than the rotation speed Nf1 corresponding to the resonant frequency f1. As a result, even if the engine rotation speed Ne increases and passes through the rotation speed Nf1 corresponding to the resonant frequency f1, the resonant frequency f is set to the resonant frequency f2 higher than the resonant frequency f1 and, therefore, the torsional resonance does not occur. The torque T2 corresponds to a lower limit torque of the present invention.

When the engine rotation speed Ne further increases higher than the rotation speed Nf1 corresponding to the resonant frequency f1 and comes close to the engine rotation speed Nf1 corresponding to the resonant frequency f2, the engine start control portion 104 reduces the cranking torque. Specifically, when the engine rotation speed Ne reaches a value (=Nf2−α) lower by the predetermined value α set in advance than the engine rotation speed Nf2 corresponding to the resonant frequency f2, it is determined that the engine rotation speed Ne comes close to the engine rotation speed Nf2. In this case, the engine start control portion 104 reduces the cranking torque to a value lower than the torque T1 depicted in FIG. 4. The torque T1 is a value adaptively obtained in advance and is set to a value at which the torsion characteristic of the damper device 38 is set to the first torsion characteristic B, i.e., the resonant frequency f1, as depicted in FIG. 4. The predetermined value α is a value adaptively obtained in advance and is a margin obtained in consideration of time until the engine rotation speed Ne reaches the rotation speed Nf2 from the rotation speed (Nf2−α) etc. The torque T1 corresponds to an upper limit torque of the present invention.

Figure 5:
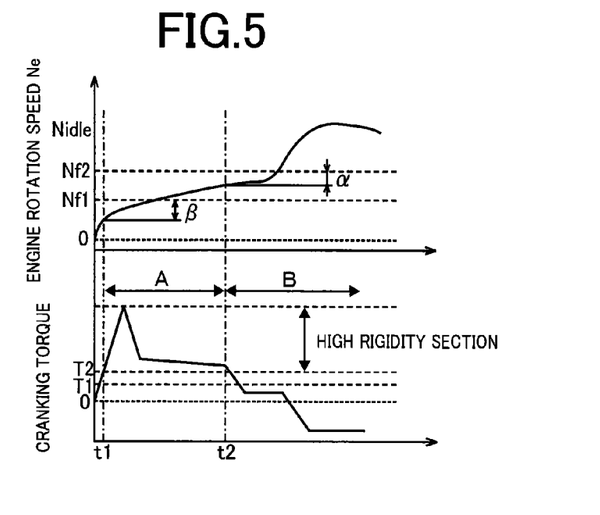
FIG. 5 is a time chart of control operations at the start of the engine.

Time t2 of FIG. 5 indicates the time when the engine rotation speed Ne reaches the rotation speed (Nf2−α). The cranking torque T decreases from time t2 and is controlled at a value lower than the torque T1. Therefore, the torsional characteristic of the damper device 38 is set to the first torsion characteristic B and the resonant frequency f is set to the resonant frequency f1. In this case, since the engine rotation speed Ne is higher than the rotation speed Nf1 corresponding to the resonant frequency f1 at time t2, even if the engine rotation speed Ne further increases, the rotation speed does not coincide with the engine rotation speed Ne corresponding to the resonant frequency f. Therefore, at the start of the engine, the engine rotation speed Ne is prevented from coinciding with the rotation speed causing the torsional resonance to occur and the occurrence of the torsional resonance is avoided.

Figure 6:
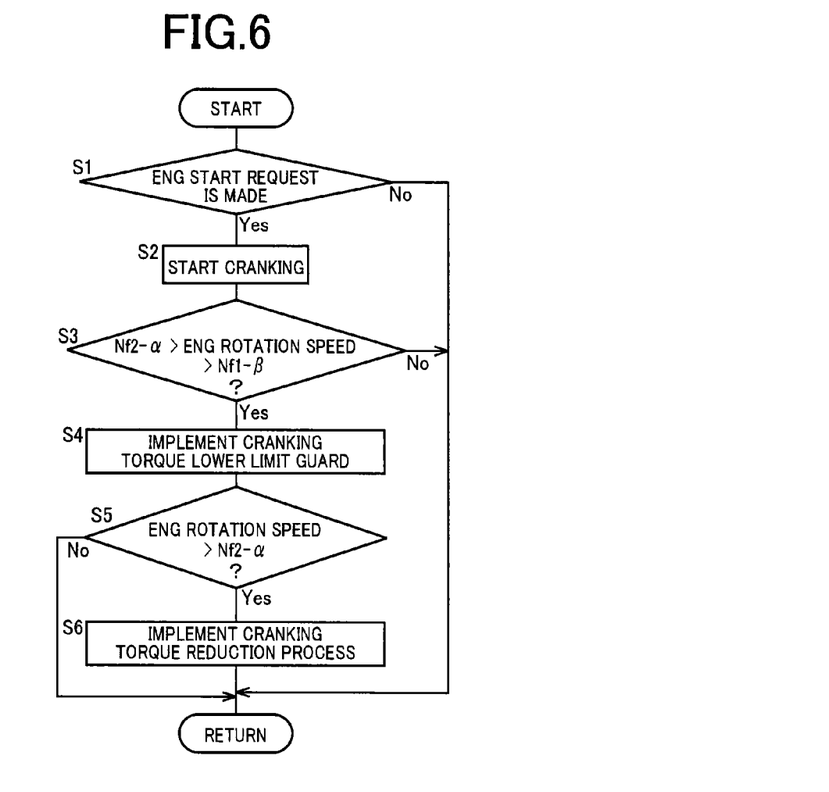
FIG. 6 is a flowchart for explaining a main portion of the control operation of the electronic control device of FIG. 1, or specifically, a control operation at the start of the engine.

FIG. 6 is a flowchart for explaining a main portion of the control operation of the electronic control device 100, or specifically, a control operation at the start of the engine, and is repeatedly executed with an extremely short cycle time, for example, on the order of few msec to a few tens of msec.

At step S1 (hereinafter, step will be omitted) corresponding to the engine start determining portion 102, it is determined whether a start request for the engine 24 is output. If S1 is denied, this routine is terminated. If S1 is affirmed, at S2 corresponding to the engine start control portion 104, the cranking torque T is transmitted from the first electric motor MG1 to start the cranking of the engine 24. At S3 corresponding to the engine start control portion 104, it is determined whether the engine rotation speed Ne is within a rotation speed range (Nf2−α>Ne>Nf1−β) between the value (=Nf1−β) lower by the predetermined value β than the engine rotation speed Nf1 corresponding to the resonant frequency f1 and the value (Nef2−α) lower by the predetermined value α than the engine rotation speed N12 corresponding to the resonant frequency f2. If S3 is denied, this routine is terminated. If S3 is affirmed, at S4 corresponding to the engine start control portion 104, the lower limit guard is set and the torque Tm1 of the first electric motor MG1 is controlled such that the cranking torque T transmitted to the damper device 38 is maintained equal to or greater than torque T2. At S5 corresponding to the engine start control portion 104, it is determined whether the engine rotation speed Ne exceeds the value (=Nf2−α) lower by the predetermined value α than the engine rotation speed Nf1 corresponding to the resonant frequency f2. If S5 is denied, this routine is terminated. On the other hand, if S5 is affirmed, torque reduction is performed such that the cranking torque T becomes equal to or less than the torque T1 and the resonant frequency f is switched from the frequency f2 to the frequency f1. As a result, the engine rotation speed Ne becomes higher than the rotation speed Nf1 corresponding to the resonant frequency f1 and, even if the engine rotation speed Ne further increases, the torsional resonance does not occur.

As described above, according to this embodiment, the torsion characteristics of the damper device 38 in the negative direction include a plurality of torsion characteristics having torsional rigidity varying depending on a torsion angle and, at the start of the engine, the plurality of the torsion characteristics can selectively be used depending on the engine rotation speed Ne to increase the engine rotation speed Ne, thereby preventing the engine rotation speed Ne from coinciding with the rotation speed corresponding to the resonant frequency f during the increase in the engine rotation speed Ne. Therefore, the torsional resonance during the increase in the engine rotation speed Ne can be avoided to improve the drivability.

According to this embodiment, when the start of the engine is initiated, since the damper device 38 has the torsion angle corresponding to the second torsion characteristic A, the rotation speed corresponding to the resonant frequency f is made higher and the engine rotation speed Ne does not reach the rotation speed. When the engine rotation speed Ne exceeds the rotation speed Nf1 corresponding to the first resonant frequency f1 to be a rotation speed lower than the rotation speed Nf2 corresponding to the second resonant frequency f2 since the electric motor torque Tm1 is reduced and the engine rotation speed Ne increases at the torsion angle corresponding to the first torsion characteristic B, the engine rotation speed Ne becomes higher than the rotation speed Nf1 corresponding to the first resonant frequency f1 and goes away from the rotation speed Nf1 corresponding to the first resonant frequency f1 as the engine rotation speed Ne increases. Since the engine rotation speed Ne is prevented from coinciding with the rotation speed corresponding to the resonant frequency f during the start of the engine in this way, the torsional resonance during the start of the engine can be avoided to improve the drivability.

According to this embodiment, the damper device 38 has at least two torsion characteristics in the torsion in the negative direction and the characteristic at the larger torsion angle θ has the higher resonant frequency f as compared to the characteristic at the smaller torsion angle θ for the engine rotation speed Ne. As a result, although a larger torque is output when the start of the engine is initiated, the resonant frequency f is made higher at this point and, therefore, the engine rotation speed Ne corresponding to the resonant frequency f is set to a higher value. Although the larger torque becomes unnecessary and the torque is reduced as the engine rotation speed Ne increases, this reduction of torque causes the resonant frequency f to switch to the lower value f1. Since the engine rotation speed Ne is higher than the rotation speed Nf1 corresponding to the resonant frequency f1 at this point, the engine rotation speed Ne is prevented from coinciding with the rotation speed corresponding to the resonant frequency f.

According to this embodiment, when the start of the engine is initiated, the electric motor torque Tm1 is controlled such that the cranking torque T transmitted to the damper device 38 does not fall below the preset torque T2 setting the torsion characteristic of the damper device 38 to the second torsion characteristic A. As a result, when the start of the engine is initiated, the torsion characteristic of the damper device 38 is initially maintained to the second torsion characteristic and the rotation speed corresponding to the resonant frequency is set to a higher value relative to the engine rotation speed Ne. Therefore, when the start of the engine is initiated, the engine rotation speed Ne can initially be kept away from the rotation speed corresponding to the resonant frequency.

According to this embodiment, when the engine rotation speed Ne reaches the rotation speed (Nf2−α) lower by the predetermined value α than the rotation speed Nf2 corresponding to the second resonant frequency f2, the electric motor torque Tm1 is controlled such that the cranking torque T transmitted to the damper device 38 becomes lower than the preset upper limit torque T1 setting the torsion characteristic of the damper device 38 to the first torsion characteristic B. As a result, when the engine rotation speed Ne reaches the rotation speed (Nf2−α) lower by the predetermined value α than the rotation speed Nf1 corresponding to the second resonant frequency f2, the torsion characteristic of the damper device 38 is switched to the first torsion characteristic B and, therefore, the engine rotation speed Ne becomes higher than the rotation speed Nf1 corresponding to the first resonant frequency f1. Thus, when further increasing, the engine rotation speed Ne is prevented from coinciding with the rotation speed Nf corresponding to the resonant frequency f.

According to this embodiment, both the rotation speed Nf1 corresponding to the first resonant frequency f1 and the rotation speed Nf1 corresponding to the second resonant frequency f2 are set to a value lower than the idle rotation speed of the engine 24. As a result, since the engine rotation speed Ne is not set to the rotation speed corresponding to the resonant frequency during driving of the engine, the occurrence of torsional resonance is avoided during driving of the engine.

Although the embodiment of the present invention has been described in detail with reference to the drawings, the present invention is applied in other forms.

For example, although the damper device 38 has two torsional characteristics, i.e., the first torsion characteristic B and the second torsion characteristic A, as the torsional characteristics at negative torsion angles in the embodiment, this is an example and the damper device 38 may be configured to be switched in three or more stages. The present invention is applicable to any damper devices having a plurality of torsion characteristics and a specific structure implementing a plurality of torsion characteristics is not limited to the structure of this embodiment.

Although the first electric motor MG1 is coupled to the damper device 38 via the planetary gear device 26 acting as a differential mechanism in the embodiment, this configuration is not necessarily a limitation and the electric motor may directly be coupled to the damper device. Therefore, the present invention is suitably applicable to any configurations having the damper device disposed between the engine and the electric motor in a power transmittable manner.

Although the cranking torque T is controlled to be equal to or greater than the torque T2 when the engine rotation speed Ne reaches the rotation speed (Nf1−β) in the embodiment, the cranking torque may be controlled to be equal to or greater than the torque T2 from the time point of initiation of the start of the engine.

The above description is merely an embodiment and the present invention may be implemented in variously modified and improved forms based on the knowledge of those skilled in the art.

NOMENCLATURE OF ELEMENTS

8: hybrid vehicle
24: engine
38: damper device
100: electronic control device (control device)
MG1: first electric motor (electric motor)
f1: resonant frequency (first resonant frequency)
f2: resonant frequency (second resonant frequency)

The invention claimed is:

1. A control device of a hybrid vehicle having a damper device disposed in a power transmission path between an engine and an electric motor,
the damper device having different torsion characteristics between torsion in positive direction in which drive power is transmitted from the engine toward the electric motor and torsion in negative direction in which drive power is transmitted from the electric motor toward the engine,
the control device being configured to increase rotation of the engine with the electric motor to start the engine,
the torsion characteristic in the negative direction of the damper device including a plurality of torsion characteristics having torsional rigidity varying depending on an angle of the torsion, and
at start of the engine, the plurality of torsion characteristics being selectively used depending on an engine rotation speed to increase the engine rotation speed.

2. The control device of a hybrid vehicle of claim 1, wherein
the damper device has a first torsion characteristic corresponding to a first resonant frequency and a second torsion characteristic corresponding to a second resonant frequency higher than the first resonant frequency in torsion in the negative direction, wherein
when the start of the engine is initiated, the engine rotation speed is increased at a torsion angle corresponding to the second torsion characteristic, and wherein
when the engine rotation speed reaches a rotation speed higher than a rotation speed corresponding to the first resonant frequency and lower than a rotation speed corresponding to the second resonant frequency, an electric motor torque of the electric motor is reduced to increase the engine rotation speed at a torsion angle corresponding to the first torsion characteristic.

3. The control device of a hybrid vehicle of claim 2, wherein
a characteristic at a larger torsion angle has a higher resonant frequency as compared to a characteristic at a smaller torsion angle for an engine rotation speed.

4. The control device of a hybrid vehicle of claim 3, wherein
when the start of the engine is initiated, the electric motor torque is controlled such that a torque transmitted to the damper device does not fall below a preset lower limit torque setting the torsion characteristic of the damper device to the second torsion characteristic.

5. The control device of a hybrid vehicle of claim 4, wherein
when the engine rotation speed reaches a rotation speed lower by a predetermined value than the rotation speed corresponding to the second resonant frequency, the electric motor torque is controlled such that a torque transmitted to the damper device becomes lower than a preset upper limit torque setting the torsion characteristic of the damper device to the first torsion characteristic.

6. The control device of a hybrid vehicle of claim 3, wherein
when the engine rotation speed reaches a rotation speed lower by a predetermined value than the rotation speed corresponding to the second resonant frequency, the electric motor torque is controlled such that a torque transmitted to the damper device becomes lower than a preset upper limit torque setting the torsion characteristic of the damper device to the first torsion characteristic.

7. The control device of a hybrid vehicle of claim 2, wherein
when the start of the engine is initiated, the electric motor torque is controlled such that a torque transmitted to the damper device does not fall below a preset lower limit torque setting the torsion characteristic of the damper device to the second torsion characteristic.

8. The control device of a hybrid vehicle of claim 7, wherein
when the engine rotation speed reaches a rotation speed lower by a predetermined value than the rotation speed corresponding to the second resonant frequency, the electric motor torque is controlled such that a torque transmitted to the damper device becomes lower than a preset upper limit torque setting the torsion characteristic of the damper device to the first torsion characteristic.

9. The control device of a hybrid vehicle of claim 2, wherein
when the engine rotation speed reaches a rotation speed lower by a predetermined value than the rotation speed corresponding to the second resonant frequency, the electric motor torque is controlled such that a torque transmitted to the damper device becomes lower than a preset upper limit torque setting the torsion characteristic of the damper device to the first torsion characteristic.

10. The control device of a hybrid vehicle of claim 1, wherein
a characteristic at a larger torsion angle has a higher resonant frequency as compared to a characteristic at a smaller torsion angle for an engine rotation speed.

* * * * *